US012485457B2

(12) United States Patent
Zhou et al.

(10) Patent No.: US 12,485,457 B2
(45) Date of Patent: Dec. 2, 2025

(54) CLEANING DEVICE FOR CRYSTALLINE SILICON RECYCLED FROM PHOTOVOLTAIC CELLS BY WET PURIFICATION

(71) Applicant: CHANGZHOU INSTITUTE OF TECHNOLOGY, Changzhou (CN)

(72) Inventors: Pin Zhou, Changzhou (CN); Jingbo Zhao, Changzhou (CN); Xiaohui Chen, Changzhou (CN); Quanfa Zhou, Changzhou (CN); Shubo Wang, Changzhou (CN); Yu Zhao, Changzhou (CN)

(73) Assignee: CHANGZHOU INSTITUTE OF TECHNOLOGY, Changzhou (CN)

( * ) Notice: Subject to any disclaimer, the term of this patent is extended or adjusted under 35 U.S.C. 154(b) by 417 days.

(21) Appl. No.: 18/091,424

(22) Filed: Dec. 30, 2022

(65) Prior Publication Data
US 2024/0050994 A1  Feb. 15, 2024

(30) Foreign Application Priority Data
Aug. 12, 2022 (CN) .......................... 202210966012.4

(51) Int. Cl.
*B08B 3/04* (2006.01)
*B08B 1/00* (2024.01)
(Continued)

(52) U.S. Cl.
CPC ................ *B08B 3/042* (2013.01); *B08B 1/12* (2024.01); *B08B 1/32* (2024.01); *Y02P 70/50* (2015.11)

(58) Field of Classification Search
CPC ... B08B 1/32; B08B 1/12; B08B 3/042; Y02P 70/50
See application file for complete search history.

(56) References Cited

U.S. PATENT DOCUMENTS 6,063,995 A  *  5/2000  Bohland ................. H10F 19/80
                                                    136/290
10,385,421 B2 *  8/2019  Tao ...................... C22B 15/0063
(Continued)

FOREIGN PATENT DOCUMENTS

| CN | 101218176 A | * | 7/2008 | ........... C01B 33/021 |
| CN | 103801545 A | * | 5/2014 | |

(Continued)

*Primary Examiner* — Benjamin L Osterhout
(74) *Attorney, Agent, or Firm* — Bayramoglu Law Offices LLC

(57) ABSTRACT

A cleaning device for crystalline silicon recycled from photovoltaic cells by wet purification includes at least two tanks, a vacuum pump and first cleaning mechanisms arranged between the tanks. The number of the first cleaning mechanisms is the same as that of the tanks. An upper end of the tank is provided with a cover plate, and a lower end of the tank is provided with a discharge port. The upper end of the tank is provided with a ventilation port. The first cleaning mechanism includes a drum. A lower end of the drum is connected with a lower hood, and an upper end of the drum is connected with an upper hood. A sealing surface is arranged respectively between the drum and the lower hood and between the drum and the upper hood. The device includes the tanks, the vacuum pump and the first cleaning mechanisms.

18 Claims, 3 Drawing Sheets

(51) Int. Cl.
   *B08B 1/04*      (2006.01)
   *B08B 1/12*      (2024.01)
   *B08B 1/32*      (2024.01)

(56)     References Cited

U.S. PATENT DOCUMENTS

2024/0079508 A1*  3/2024  Zhou ..................... H10F 77/219
   2024/0079514 A1*  3/2024  Zhou ................. H01L 21/68728
   2024/0246090 A1*  7/2024  Ribeiro Dias ............ B03B 9/06

FOREIGN PATENT DOCUMENTS

CN         108726521  A   *  11/2018    ............. B08B 3/044
   CN         114314592  A   *   4/2022
   KR         101747912  B1  *   6/2017
   WO       WO-9517547   A1  *   6/1995    ......... D21C 11/0007
   WO     WO-2017037260  A1  *   3/2017    ............. B29B 17/02
   WO     WO-2018194729  A1  *  10/2018    ............. B28D 5/042
   WO     WO-2023115122  A1  *   6/2023    ............. B02C 23/14

* cited by examiner

CLEANING DEVICE FOR CRYSTALLINE SILICON RECYCLED FROM PHOTOVOLTAIC CELLS BY WET PURIFICATION

CROSS REFERENCE TO THE RELATED APPLICATIONS

This application is based upon and claims priority to Chinese Patent Application No. 202210966012.4, filed on Aug. 12, 2022, the entire contents of which are incorporated herein by reference.

TECHNICAL FIELD

The disclosure relates to the technical field of photovoltaic cell recycling, in particular to a cleaning device for crystalline silicon recycled from photovoltaic cells by wet purification.

BACKGROUND

With the rapid development of photovoltaic power generation technology, the installed cost of the photovoltaic power plant keeps dropping, and the cost performance of power generation is greatly improved. Photovoltaic power generation has become one of the cheapest ways to generate electricity. As large-scale centralized and distributed photovoltaic power generation projects are put into operation, the problem of disposal of waste photovoltaic modules will become increasingly prominent. Improper disposal of waste photovoltaic modules not only leads to environmental pollution, but also causes waste of resources.

In a crystalline silicon photovoltaic module, the manufacture of cells accounts for 65% of the production cost of the whole module, and silicon wafers account for 60% of the cost of the crystalline silicon cells. Studies have shown that it is much cheaper to melt and cast the recycled crystalline silicon wafers to form high-purity silicon than to extract silicon from quartz sand. A traditional crystalline silicon photovoltaic module is mainly composed of glass, a backsheet, an aluminum frame, crystalline silicon solar cells, EVA and a junction box. At present, methods for recycling crystalline silicon from waste photovoltaic modules mainly includes a wet process and heating treatment.

In the recycling of crystalline silicon from photovoltaic cells by wet purification, organic solvents are used to dissolve EVA. In an organic acid dissolution method, trichloroethylene, benzene, toluene, o-dichlorobenzene or acetone is used to separate the silicon wafer from the glass. Then, chemical reagents such as sodium hydroxide, nitric acid and hydrofluoric acid are used to sequentially dissolve the aluminum BSF, the silver electrode, the anti-reflective coating and other impurities on the surface of the silicon wafer. Thereby, a silicon material with higher purity is obtained. In the recycling process, in order to improve the dissolving effect and increase the contact area between the silicon wafer and the chemical reagents, it is generally necessary to crush the silicon wafer. Typically, the crushed silicon material has a particle size of less than 1 mm. Finally, the crushed silicon wafer is cleaned to obtain high-purity crystalline silicon.

In the recycling of crystalline silicon by heating treatment, EVA is removed based on the fact that EVA is gradually decomposed at high temperature. At present, high-temperature heating treatment is mainly classified into oxygen-absent high-temperature heating treatment and oxygen-present high-temperature heating treatment, both of which have an EVA removal rate of 99% or above. However, when the heating treatment is used to recycle crystalline silicon, more energy will be consumed, and there are still a small amount of organic impurities remaining on the surface of the crystalline silicon, which affects the subsequent use of the crystalline silicon.

In the crystalline silicon fragments recycled by wet purification, impurities such as some organic solvents and inorganic acids may adhere to the surface. The organic solvents may form a hydrophobic area on the surface of the crystalline silicon fragments due to their strong hydrophobicity. In particular, when the organic solvents are in the depressions of the crystalline silicon fragments, after the crystalline silicon fragments are placed in a cleaning agent, a small amount of air, i.e., small bubbles, will adhere to the depressions of the crystalline silicon fragments. These bubbles are not easy to remove. Even with intense agitation, it is not easy to separate the bubbles from the crystalline silicon fragments, so that the cleaning agent cannot reach this area, forming an "unreachable area", causing a poor cleaning effect.

SUMMARY

An object of the disclosure is to provide a cleaning device for crystalline silicon recycled from photovoltaic cells by wet purification so as to overcome the defects in the prior art.

To achieve the above object, the disclosure adopts the following technical solutions:

A cleaning device for crystalline silicon recycled from photovoltaic cells by wet purification includes at least two tanks, a vacuum pump and first cleaning mechanisms arranged between the tanks. The number of the first cleaning mechanisms is the same as that of the tanks. An upper end of the tank is provided with a cover plate, and a lower end of the tank is provided with a discharge port. The upper end of the tank is provided with a ventilation port. The first cleaning mechanism includes a drum. A lower end of the drum is connected with a lower hood, and an upper end of the drum is connected with an upper hood. A sealing surface is arranged respectively between the drum and the lower hood and between the drum and the upper hood. Evenly distributed fluid channels are arranged inside the drum. The lower hood communicates with the upper hood through the fluid channels. The lower hood communicates with the lower end of one of the tanks through a first connecting tube, and the upper hood communicates with the upper end of the other tank through a second connecting tube. An inlet end of the vacuum pump is connected to the upper end of the tank through a third connecting tube. The number of the third connecting tubes is the same as that of the tanks.

Preferably, an upper end of the lower hood and an upper end of the upper hood are respectively provided with a fixed ring, an outer wall of the drum and an inner wall of the fixed ring are in a running fit, and a sealing ring is mounted between the fixed ring and the drum.

Preferably, the first cleaning mechanism further includes a driving mechanism for driving the drum to rotate. The driving mechanism includes an electric motor, a first gear and a second gear. The first gear is mounted on an output shaft of the electric motor, the second gear is mounted on the outer wall of the drum, and the first gear is meshed with the second gear. The electric motor rotates to drive the drum to rotate. When a liquid flows along the fluid channels, the electric motor drives the drum to rotate, and an inner wall of the fluid channel drives the liquid to stir, so that the crystalline silicon fragments in the fluid channels are fully stirred and make full contact with the cleaning agent, thereby effectively improving the cleaning effect.

Preferably, an outer wall of the tank is further provided with a bearing seat adapted to the drum. The bearing seat can ensure the stability of the drum when rotating.

Preferably, the fluid channels have a diameter of 3 mm-10 mm. A total cross-sectional area of the fluid channels is less than a cross-sectional area of the first connecting tube (the first connecting tube has the same diameter as the second connecting tube), so that after a material enters the fluid channels, its flow velocity will increase to some extent, thereby improving the mixing effect of the crystalline silicon fragments and the cleaning agent.

Preferably, the inner wall of the fluid channel is provided with alternately distributed first bristles, and a minimum distance between a free end of the first bristle and a corresponding surface of the fluid channel is greater than 1.5 mm. Due to the small gap between the first bristle and the inner wall of the fluid channel, the fluid channel can limit the motion area of the crystalline silicon fragments, so that the crystalline silicon fragments can easily make contact with the first bristles. Thus, only by transferring the material once, the crystalline silicon fragments can make contact with the first bristles many times.

Preferably, an end of the second connecting tube extends into the tank, with an opening of the second connecting tube facing downward, a second cleaning mechanism is arranged inside the tank, and the second cleaning mechanism is located below the opening of the second connecting tube.

Preferably, the second cleaning mechanism is an impeller. The impeller includes a rotating shaft arranged horizontally. An end of the rotating shaft is rotatably connected to an inner wall of the tank. The rotating shaft is provided with evenly distributed blades, and the blade is provided with evenly distributed second bristles. The liquid discharged by the second connecting tube just hits the blades, such that the crystalline silicon fragments are further cleaned through the second bristles. Moreover, the liquid flow impacts the blades to make them rotate, i.e., drives the rotating shaft to rotate. The rotating blades can stir the material in the tank, thereby further improving the mixing effect of the crystalline silicon fragment and the cleaning agent and ensuring the cleaning quality.

Preferably, the number of the impellers inside each tank is two, the opening of the second connecting tube is provided with a divider, and the impellers are located on two sides of the divider. By arranging the divider, the liquid discharged by the second connecting tube is divided into two parts which drive the two impellers to rotate at the same time. Moreover, the impellers rotate in opposite directions, which makes the crystalline silicon fragments and the cleaning agent inside the tank mixed more uniformly.

Preferably, the second connecting tube, the third connecting tube, the discharge port and the ventilation port are respectively provided with a valve.

The disclosure has the following advantages:

1. The device includes the tanks, the vacuum pump and the first cleaning mechanisms. When the device operates, the crystalline silicon fragments and the cleaning agent are added to one of the tanks, and then the vacuum pump is used to vacuumize the other tank. The valve on the second connecting tube is opened, and the material in the tank is transferred through the first cleaning mechanism under the action of pressure difference. Because of the lower pressure in the tank in communication with the vacuum pump, the hydraulic pressure received by the crystalline silicon fragments becomes smaller, so that the bubbles adhering to the crystalline silicon fragments expand and protrude out of the depressions on the crystalline silicon fragments. The inner wall of the fluid channel is provided with the alternately distributed first bristles, and the fluid channels have a small diameter. The fluid channel can limit the motion area of the crystalline silicon fragments, so that the crystalline silicon fragments can easily make contact with the first bristles. Finally, the bubbles can be easily separated from the crystalline silicon fragments under the action of the first bristles, thereby eliminating the "unreachable area" on the crystalline silicon fragments. Thus, the crystalline silicon fragments can make full contact with the cleaning agent, so that the cleaning agent can effectively remove the impurities remaining on the crystalline silicon fragments.

2. In the device, when the liquid flows along the fluid channels, the electric motor drives the drum to rotate, and the inner wall of the fluid channel drives the liquid to stir, so that the crystalline silicon fragments in the fluid channels are fully stirred and make full contact with the cleaning agent, thereby effectively improving the cleaning effect.

3. The second cleaning mechanism is further arranged in the device. The material in the tank is transferred through the first cleaning mechanism and finally discharged through the second connecting tube. The liquid discharged by the second connecting tube just hits the blades, such that the crystalline silicon fragments are further cleaned through the second bristles. Moreover, the liquid flow impacts the blades to make them rotate, thus stirring the material in the tank, thereby further improving the mixing effect of the crystalline silicon fragment and the cleaning agent and ensuring the cleaning quality.

4. At least two tanks are arranged in the device. The material is transferred back and forth between the two tanks. The vacuum pump is used to provide the kinetic energy for the material to flow, which improves the mixing effect of the crystalline silicon fragments and the cleaning agent. With the vacuum pump, there is no need to use other stirring mechanism, which not only effectively saves the energy and but also ensures the crystalline silicon fragments to be cleaned thoroughly.

In the figures: 1 tank, 2 drum, 3 lower hood, 4 upper hood, 5 first connecting tube, 6 second connecting tube, 7 vacuum pump, 8 third connecting tube, 9 discharge port, 10 ventilation port, 11 impeller, 12 electric motor, 13 first gear, 14 second gear, 15 cover plate, 16 divider, 17 fixed ring, 18 sealing ring, 19 fluid channel, 20 first bristle, 21 bearing seat, 111 rotating shaft, 112 blade, and 113 second bristle.

DETAILED DESCRIPTION OF THE EMBODIMENTS

The technical solutions in the embodiments of the disclosure will be clearly and completely described below with reference to the accompanying drawings in the embodiments of the disclosure. It is apparent that the described embodiments are only a part of the embodiments, rather than all of the embodiments of the disclosure.

Figure 1:
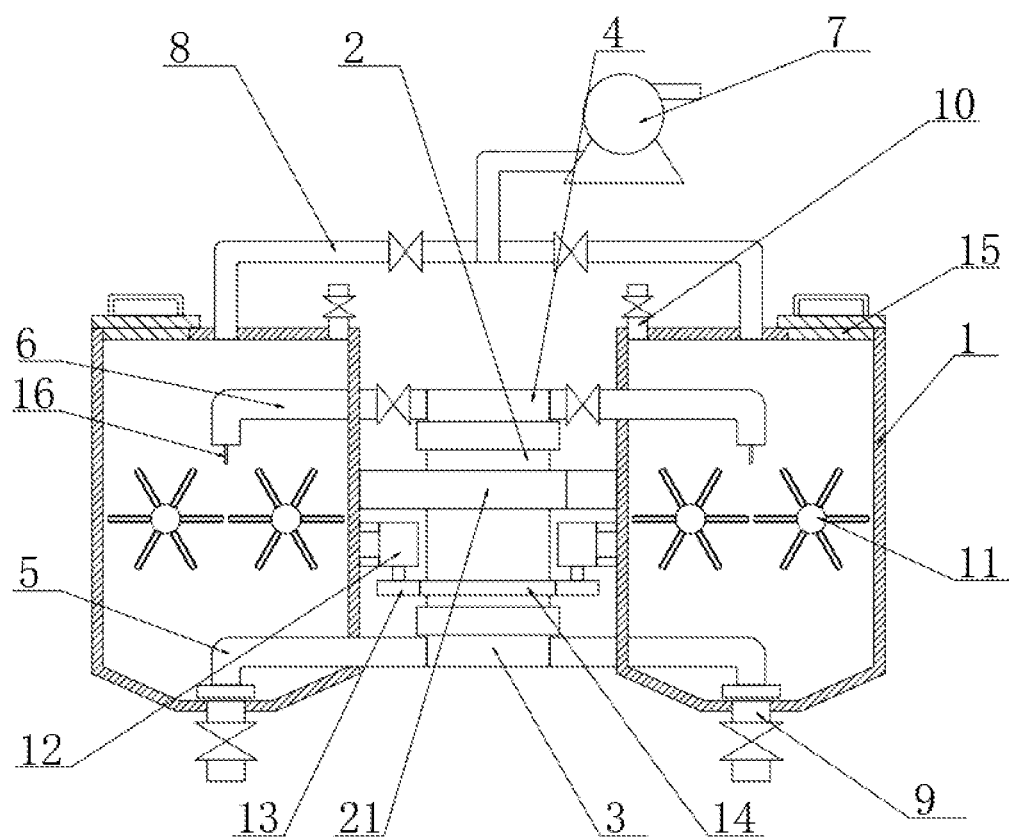
FIG. 1 is a schematic structural diagram of a front view of a cleaning device for crystalline silicon recycled from photovoltaic cells by wet purification according to the disclosure.
Figure 2:
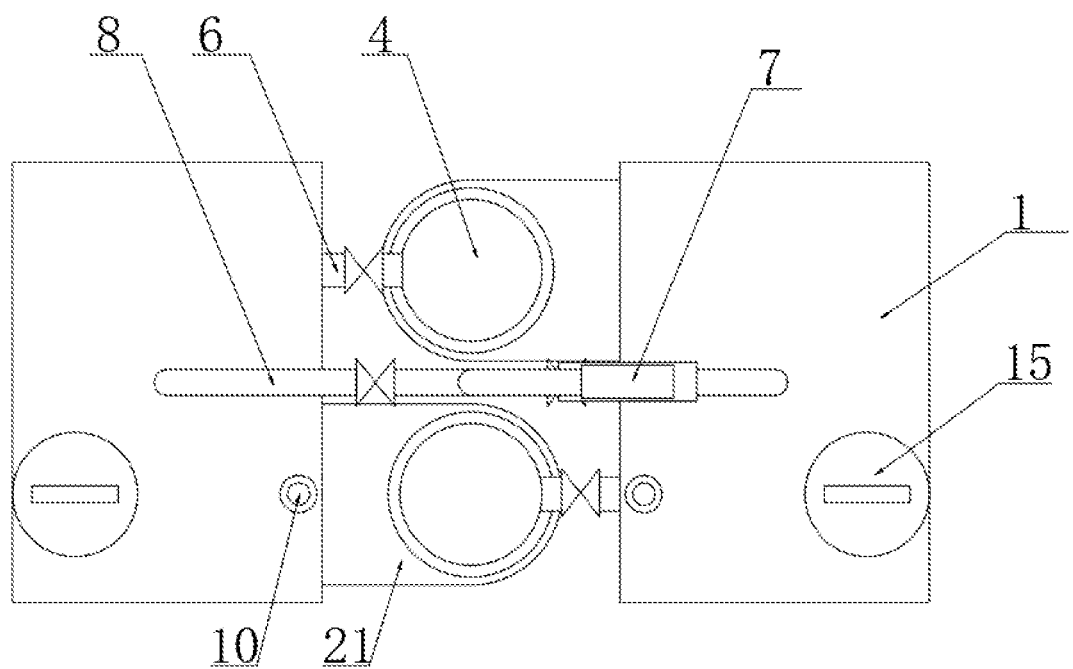
FIG. 2 is a schematic structural diagram of a top view of the cleaning device for crystalline silicon recycled from photovoltaic cells by wet purification according to the disclosure.
Figure 3:
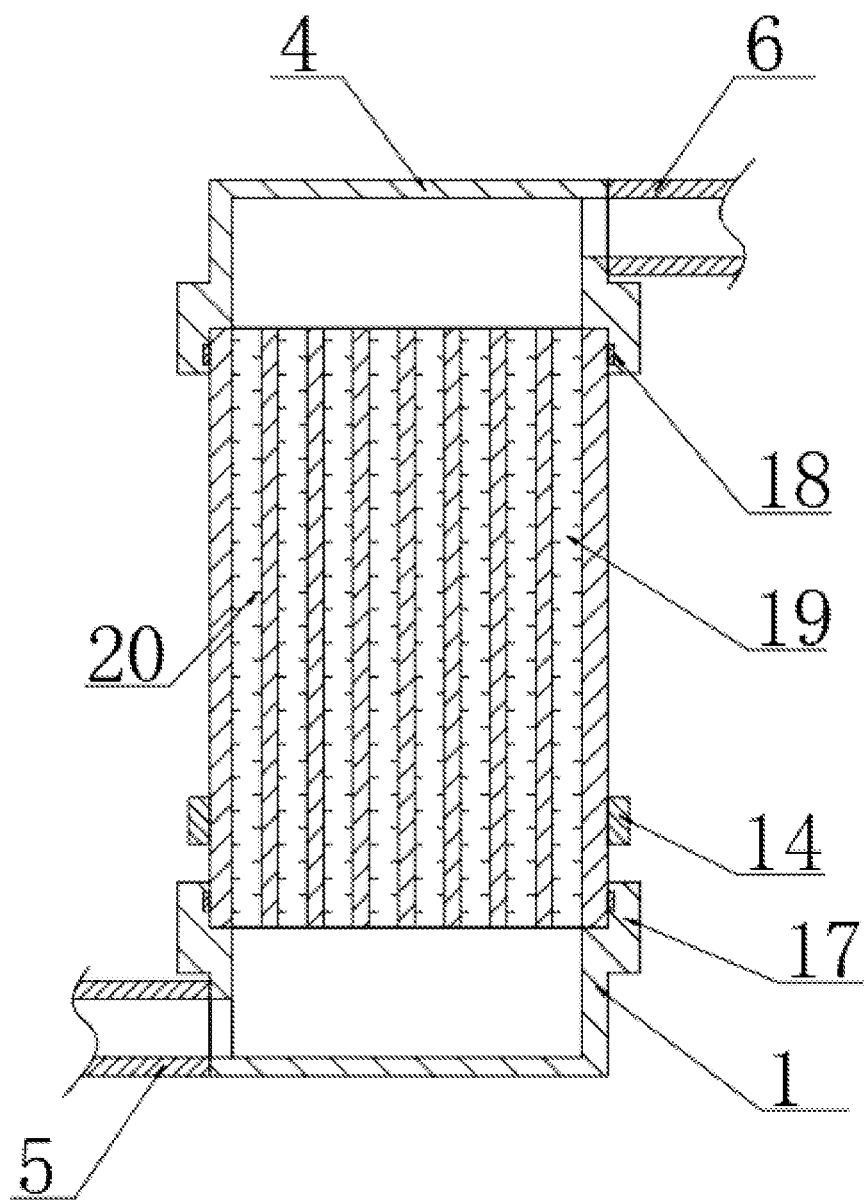
FIG. 3 is a schematic structural diagram of a sectional view of a drum of the cleaning device for crystalline silicon recycled from photovoltaic cells by wet purification according to the disclosure.
Figure 4:
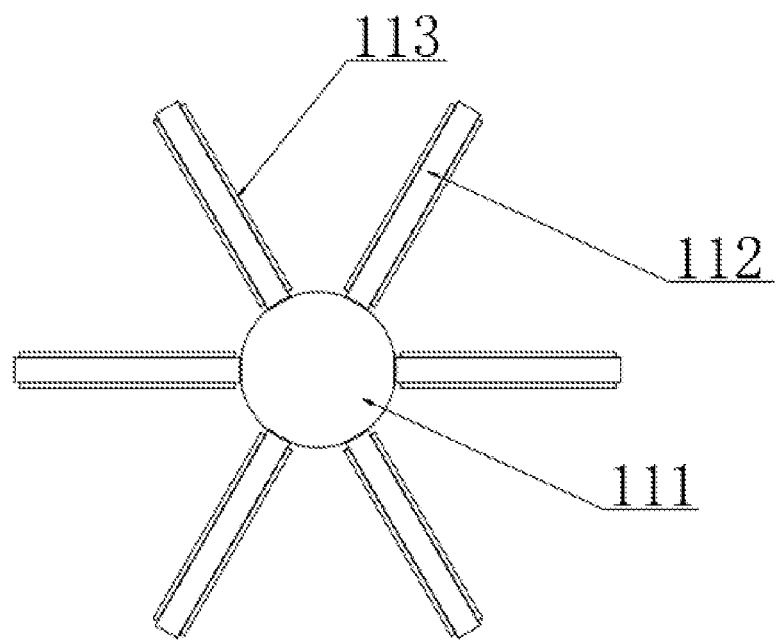
FIG. 4 is a schematic structural diagram of a front view of an impeller of the cleaning device for crystalline silicon recycled from photovoltaic cells by wet purification according to the disclosure.
Figure 5:
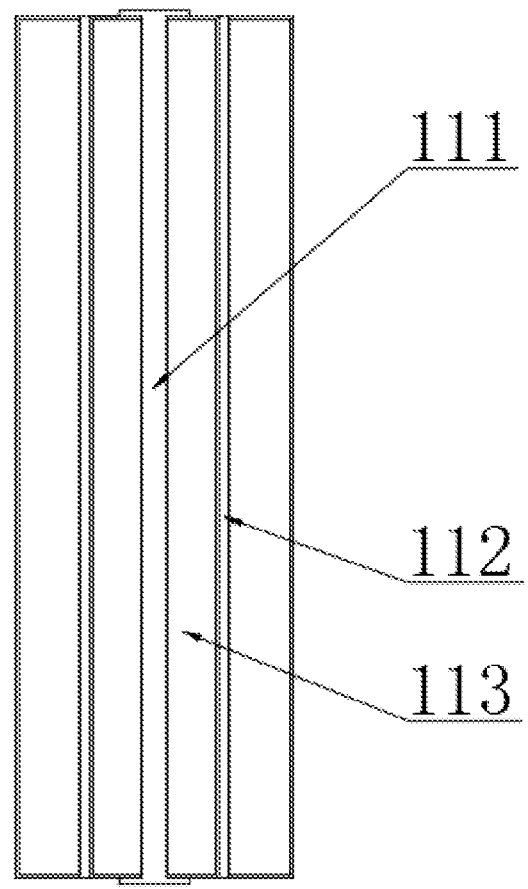
FIG. 5 is a schematic structural diagram of a top view of the impeller of the cleaning device for crystalline silicon recycled from photovoltaic cells by wet purification according to the disclosure.

Referring to FIGS. 1-5, a cleaning device for crystalline silicon recycled from photovoltaic cells by wet purification includes at least two tanks 1, a vacuum pump 7 and first cleaning mechanisms arranged between the tanks 1. The number of the first cleaning mechanisms is the same as that of the tanks 1. An upper end of the tank 1 is provided with a cover plate 15. The cover plate 15 is convenient to open. The cover plate 15 is threadedly connected to the tank 1, so that the material can be added. A sealing surface is arranged between the cover plate 15 and the tank 1. A lower end of the tank 1 is provided with a discharge port 9. The upper end of the tank 1 is provided with a ventilation port 10. The first cleaning mechanism includes a drum 2. A lower end of the drum 2 is connected with a lower hood 3, and an upper end of the drum 2 is connected with an upper hood 4. A sealing surface is arranged respectively between the drum 2 and the lower hood 3 and between the drum and the upper hood 4. Evenly distributed fluid channels 19 are arranged inside the drum 2. The lower hood 3 communicates with the upper hood 4 through the fluid channels 19. The lower hood 3 communicates with the lower end of one of the tanks 1 through a first connecting tube 5, and the upper hood 4 communicates with the upper end of the other tank 1 through a second connecting tube 6. An inlet end of the vacuum pump 7 is connected to the upper end of the tank 1 through a third connecting tube 8. The number of the third connecting tubes 8 is the same as that of the tanks 1. The second connecting tube 6, the third connecting tube 8, the discharge port 9 and the ventilation port 10 are respectively provided with a valve.

An upper end of the lower hood 3 and an upper end of the upper hood 4 are respectively provided with a fixed ring 17, an outer wall of the drum 2 and an inner wall of the fixed ring 17 are in a running fit, and a sealing ring 18 is mounted between the fixed ring 17 and the drum 2. The first cleaning mechanism further includes a driving mechanism for driving the drum 2 to rotate. The driving mechanism includes an electric motor 12, a first gear 13 and a second gear 14. The first gear 13 is mounted on an output shaft of the electric motor 12, the second gear 14 is mounted on the outer wall of the drum 2, and the first gear 13 is meshed with the second gear 14. The electric motor 12 rotates to drive the drum 2 to rotate. An outer wall of the tank 1 is further provided with a bearing seat 21 adapted to the drum 2. The bearing seat 21 can ensure the stability of the drum 2 when rotating. When a liquid flows along the fluid channels 19, the electric motor 12 drives the drum 2 to rotate, and an inner wall of the fluid channel 19 drives the liquid to stir, so that the crystalline silicon fragments in the fluid channels 19 are fully stirred and make full contact with the cleaning agent, thereby effectively improving the cleaning effect.

The fluid channels 19 have a diameter of 3 mm-10 mm. A total cross-sectional area of the fluid channels 19 is less than a cross-sectional area of the first connecting tube 5 (the first connecting tube 5 has the same diameter as the second connecting tube 6), so that after a material enters the fluid channels 19, its flow velocity will increase to some extent, thereby improving the mixing effect of the crystalline silicon fragments and the cleaning agent. The inner wall of the fluid channel 19 is provided with alternately distributed first bristles 20, and a minimum distance between a free end of the first bristle 20 and a corresponding surface of the fluid channel 19 is greater than 1.5 mm. Due to the small diameter of the fluid channels 9 and the small gap between the first bristle 20 and the inner wall of the fluid channel 9, the fluid channel 9 can limit the motion area of the crystalline silicon fragments, so that the crystalline silicon fragments can easily make contact with the first bristles 20. Thus, only by transferring the material once, the crystalline silicon fragments can make contact with the first bristles 20 many times.

An end of the second connecting tube 6 extends into the tank 1, with an opening of the second connecting tube 6 facing downward, a second cleaning mechanism is arranged inside the tank 1, and the second cleaning mechanism is located below the opening of the second connecting tube 6. The second cleaning mechanism is an impeller 11. The impeller 11 includes a rotating shaft 111 arranged horizontally. An end of the rotating shaft 111 is rotatably connected to an inner wall of the tank 1. The rotating shaft 111 is provided with evenly distributed blades 112, and the blade 112 is provided with evenly distributed second bristles 113. The liquid discharged by the second connecting tube 6 just hits the blades 112, such that the crystalline silicon fragments are further cleaned through the second bristles 113. Moreover, the liquid flow impacts the blades 112 to make them rotate, i.e., drives the rotating shaft 111 to rotate. The rotating blades 112 can stir the material in the tank 1, thereby further improving the mixing effect of the crystalline silicon fragment and the cleaning agent and ensuring the cleaning quality.

Further, the number of the impellers 11 inside each tank 1 is two, the opening of the second connecting tube 6 is provided with a divider 16, and the impellers 11 are located on two sides of the divider 16. By arranging the divider 16, the liquid discharged by the second connecting tube 6 is divided into two parts which drive the two impellers 11 to rotate at the same time. Moreover, the impellers 11 rotate in opposite directions, which makes the crystalline silicon fragments and the cleaning agent inside the tank 1 mixed more uniformly.

Working principle: When the device operates, the crystalline silicon fragments and the cleaning agent are added to one of the tanks 1 (the valve on the ventilation port 10 is in an opened state), and then the vacuum pump 7 is used to vacuumize the other tank 1 (the valve on the ventilation port 10 is in a closed state). After the vacuum reaches a preset value, the valve on the second connecting tube 6 is opened, and the material in the tank 1 is transferred sequentially through the first connecting tube 5, the drum 2 and the second connecting tube 6 under the action of pressure difference. Because of the lower pressure in the tank 1 in communication with the vacuum pump 7, the hydraulic pressure received by the crystalline silicon fragments becomes smaller, so that the bubbles adhering to the crystalline silicon fragments expand and protrude out of the depressions on the crystalline silicon fragments. The inner wall of the fluid channel 19 is provided with the alternately distributed first bristles 20, and the fluid channels 19 have a small diameter. The fluid channel 19 can limit the motion area of the crystalline silicon fragments, so that the crystalline silicon fragments can easily make contact with the first bristles 20. Finally, the bubbles can be easily separated from the crystalline silicon fragments under the action of the first bristles 20, thereby eliminating the "unreachable area" on the crystalline silicon fragments. Thus, the crystalline silicon fragments can make full contact with the cleaning agent, so that the cleaning agent can effectively remove the impurities remaining on the crystalline silicon fragments. The liquid discharged by the second connecting tube 6 just hits the blades 112, such that the crystalline silicon fragments are further cleaned through the second bristles 113. Moreover, the liquid flow impacts the blades 112 to make them rotate, i.e., drives the rotating shaft 111 to rotate. The rotating blades 112 can stir the material in the tank 1, thereby further improving the mixing effect of the crystalline silicon fragment and the cleaning agent and ensuring the cleaning quality.

After the transfer of the material is completed, the valve on the ventilation port 10 of the tank 1 that the material therein has been discharged is closed, the vacuum pump 7 is shut down, and the valves on all the third connecting tubes 8 are opened, so that part of air in the tank 1 that material therein has been discharged is transferred to the tank 1 storing the material, which saves the energy and reduces the subsequent work load of the vacuum pump 7. Then, the valve on the third connecting tube 8 corresponding to the tank 1 storing the material is closed, the valve on the ventilation port 10 is opened, and the vacuum pump 7 is used to vacuumize the tank 1 that material therein has been discharged. After the vacuum reaches a preset value, the valve on the corresponding second connecting tube 6 is opened, such that the material is transferred again. This process is repeated such that the crystalline silicon fragments are thoroughly cleaned, which improves the cleaning effect.

After the completion of the cleaning, the crystalline silicon fragments are rinsed with deionized water to obtain high-purity crystalline silicon fragments.

The foregoing descriptions are merely preferred implementations of the disclosure, but the protection scope of the disclosure is not limited thereto. Any equivalent substitution or change made based on the technical solution and inventive concept of the disclosure by those skilled in the art within the technical scope disclosed in the disclosure shall fall within the protection scope of the disclosure.

What is claimed is:

1. A cleaning device for crystalline silicon recycled from photovoltaic cells by wet purification, comprising at least two tanks, a vacuum pump and first cleaning mechanisms arranged between the at least two tanks,
   wherein a number of the first cleaning mechanisms is the same as a number of the at least two tanks, an upper end of each of the at least two tanks is provided with a cover plate, and a lower end of each of the at least two tanks is provided with a discharge port,
   wherein the upper end of each of the at least two tanks is provided with a ventilation port, each of the first cleaning mechanisms comprises a drum, a lower end of the drum is connected with a lower hood, an upper end of the drum is connected with an upper hood, a sealing surface is arranged respectively between the drum and the lower hood and between the drum and the upper hood, evenly distributed fluid channels are arranged inside the drum, the lower hood communicates with the upper hood through the fluid channels, the lower hood communicates with the lower end of a first one of the at least two tanks through a first connecting tube, the upper hood communicates with the upper end of a second one of the at least two tanks through a second connecting tube, an inlet end of the vacuum pump is connected to the upper end of each of the at least two tanks through a third connecting tube, and a number of the third connecting tubes is the same as the number of the at least two tanks.

2. The cleaning device according to claim 1, wherein an upper end of the lower hood and an upper end of the upper hood are respectively provided with a fixed ring, an outer wall of the drum and an inner wall of the fixed ring are in a running fit, and a sealing ring is mounted between the fixed ring and the drum.

3. The cleaning device according to claim 2, wherein the second connecting tube, the third connecting tube, the discharge port and the ventilation port are respectively provided with a valve.

4. The cleaning device according to claim 2, wherein each of the first cleaning mechanisms further comprises a driving mechanism for driving the drum to rotate, the driving mechanism comprises an electric motor, a first gear and a second gear, the first gear is mounted on an output shaft of the electric motor, the second gear is mounted on the outer wall of the drum, the first gear is meshed with the second gear, and the electric motor rotates to drive the drum to rotate.

5. The cleaning device according to claim 4, wherein the second connecting tube, the third connecting tube, the discharge port and the ventilation port are respectively provided with a valve.

6. The cleaning device according to claim 4, wherein an outer wall of each of the at least two tanks is further provided with a bearing seat adapted to the drum.

7. The cleaning device according to claim 6, wherein the second connecting tube, the third connecting tube, the discharge port and the ventilation port are respectively provided with a valve.

8. The cleaning device according to claim 1, wherein the fluid channels have a diameter of 3 mm-10 mm.

9. The cleaning device according to claim 8, wherein the second connecting tube, the third connecting tube, the discharge port and the ventilation port are respectively provided with a valve.

10. The cleaning device according to claim 8, wherein an inner wall of each of the fluid channels is provided with alternately distributed bristles, and a minimum distance between a free end of each of the bristles and a corresponding surface of each of the fluid channels is greater than 1.5 mm.

11. The cleaning device according to claim 10, wherein the second connecting tube, the third connecting tube, the discharge port and the ventilation port are respectively provided with a valve.

12. The cleaning device according to claim 1, wherein an end of the second connecting tube extends into the tank, with an opening of the second connecting tube facing downward, a second cleaning mechanism is arranged inside each of the at least two tanks, and the second cleaning mechanism is located below the opening of the second connecting tube.

13. The cleaning device according to claim 12, wherein the second connecting tube, the third connecting tube, the discharge port and the ventilation port are respectively provided with a valve.

14. The cleaning device according to claim 12, wherein the second cleaning mechanism is an impeller, the impeller comprises a rotating shaft arranged horizontally, an end of the rotating shaft is rotatably connected to an inner wall of each of the at least two tanks, the rotating shaft is provided with evenly distributed blades, and each of the blades is provided with evenly distributed bristles.

15. The cleaning device according to claim 14, wherein the second connecting tube, the third connecting tube, the discharge port and the ventilation port are respectively provided with a valve.

16. The cleaning device according to claim 14, wherein a number of the impellers inside each of the at least two tanks is two, the opening of the second connecting tube is provided with a divider, and the impellers are located on two sides of the divider.

17. The cleaning device according to claim 16, wherein the second connecting tube, the third connecting tube, the discharge port and the ventilation port are respectively provided with a valve.

18. The cleaning device according to claim 1, wherein the second connecting tube, the third connecting tube, the discharge port and the ventilation port are respectively provided with a valve.

* * * * *